United States Patent
Furfari et al.

(10) Patent No.: US 10,633,116 B2
(45) Date of Patent: Apr. 28, 2020

(54) PREVENTING CRACKS AT BOLTED OR RIVETED JOINTS OF AIRCRAFT STRUCTURAL PARTS

(71) Applicant: Airbus Operations GmbH, Hamburg (DE)

(72) Inventors: Domenico Furfari, Hamburg (DE); Nikolaus Ohrloff, Hamburg (DE)

(73) Assignee: Airbus Operations GmbH (DE)

( * ) Notice: Subject to any disclaimer, the term of this patent is extended or adjusted under 35 U.S.C. 154(b) by 234 days.

(21) Appl. No.: 14/838,912

(22) Filed: Aug. 28, 2015

(65) Prior Publication Data
US 2016/0068278 A1 Mar. 10, 2016

(30) Foreign Application Priority Data
Sep. 8, 2014 (EP) .................................... 14183952

(51) Int. Cl.
*B64F 5/10* (2017.01)
*B64C 1/26* (2006.01)
(Continued)

(52) U.S. Cl.
CPC .............. *B64F 5/10* (2017.01); *B21J 15/142* (2013.01); *B64C 1/12* (2013.01); *B64C 1/26* (2013.01);
(Continued)

(58) Field of Classification Search
CPC ..... B64C 1/26; B64C 1/12; B64C 3/00; B64F 5/00; B64F 5/10; B64F 5/40;
(Continued)

(56) References Cited

U.S. PATENT DOCUMENTS 1,922,063 A * 8/1933 Vaughn .................. B64C 1/061
  244/120
1,932,430 A * 10/1933 Weyerbacher ............ B64C 1/12
  244/119
(Continued)

FOREIGN PATENT DOCUMENTS

DE        694 31 314 T2    1/2003
DE    10 2008 044 407 A1   6/2010
(Continued)

OTHER PUBLICATIONS

S. Zou, Z. Cao, Y. Zhao, and M. Qian, "Laser peening of aluminum alloy 7050 with fastener holes," Chin. Opt. Lett. 6, 116-119 (2008). Accessible from https://www.osapublishing.org/col/abstract.cfm?uri=col-6-2-116; accessed on Mar. 28, 2017.*
(Continued)

*Primary Examiner* — Christopher P Ellis
(74) *Attorney, Agent, or Firm* — Lerner, David, Littenberg, Krumholz & Mentlik, LLP (57) ABSTRACT

A method for joining two aircraft structural parts by a bolted or riveted joint and for preventing cracks at said joint includes providing a first metallic aircraft structural part and a second aircraft structural part, wherein the first aircraft structural part includes a first joint region and a second aircraft structural part includes a second joint region. Furthermore, the method includes inducing compressive residual stresses in a first area of the first joint region for preventing cracks by applying parallel crack retarding regions formed as stripes in the first area, drilling fastener holes in the first and second areas of the first. Finally, the method includes a step of fastening together the first and second aircraft structural parts at the first and second joint regions by a bolted or riveted joint.

10 Claims, 5 Drawing Sheets

(51) Int. Cl.
  *B64C 1/12* (2006.01)
  *C21D 10/00* (2006.01)
  *F16B 5/04* (2006.01)
  *B21J 15/14* (2006.01)
  *C21D 7/08* (2006.01)
  *F16B 17/00* (2006.01)

(52) U.S. Cl.
  CPC .............. *C21D 7/08* (2013.01); *C21D 10/00* (2013.01); *C21D 10/005* (2013.01); *F16B 5/04* (2013.01); *F16B 17/008* (2013.01)

(58) Field of Classification Search
  CPC .... B22F 2003/166; B21J 15/02; B21J 15/142; C21D 10/00; C21D 10/005; C21D 7/08; C21D 7/06; C21D 7/04; F16B 5/04; F16B 17/008
  USPC .................. 244/131; 29/90.3, 524.1, 525.06
  See application file for complete search history.

(56) References Cited

U.S. PATENT DOCUMENTS

| | | | |
|---|---|---|---|
| 2,378,043 A * | 6/1945 | Sorensen | B64F 5/10 29/281.1 |
| 2,639,788 A * | 5/1953 | Gustafson | B64C 1/06 244/131 |
| 2,810,191 A * | 10/1957 | Hauna | B21D 31/00 72/340 |
| 3,850,698 A | 11/1974 | Mallozzi et al. | |
| 4,401,477 A | 8/1983 | Clauer et al. | |
| 4,937,421 A | 6/1990 | Ortiz, Jr. et al. | |
| 5,297,760 A * | 3/1994 | Hart-Smith | B64C 1/068 244/131 |
| 5,569,018 A | 10/1996 | Mannava et al. | |
| 5,571,575 A | 11/1996 | Takayanagi | |
| 5,842,317 A | 12/1998 | Pettit | |
| 6,159,619 A | 12/2000 | Rockstroh et al. | |
| 6,203,633 B1 | 3/2001 | Clauer et al. | |
| 6,288,358 B1 | 9/2001 | Dulaney et al. | |
| 6,328,261 B1 * | 12/2001 | Wollaston | B23K 20/122 228/112.1 |
| 6,349,988 B1 | 2/2002 | Foster et al. | |
| 6,742,376 B2 * | 6/2004 | Easterbrook | B21C 23/001 72/334 |
| 6,775,895 B2 * | 8/2004 | Koffi | F16B 5/00 29/407.08 |
| 7,219,044 B1 * | 5/2007 | Prevey | G06F 17/50 703/7 |
| 7,857,258 B2 | 12/2010 | Normand et al. | |
| 8,322,004 B2 | 12/2012 | Lewis et al. | |
| 2002/0050157 A1 | 5/2002 | Kennerknecht et al. | |
| 2002/0148270 A1 * | 10/2002 | Easterbrook | B21C 23/001 72/334 |
| 2002/0174528 A1 * | 11/2002 | Prevey, III | B65B 25/148 29/33 R |
| 2003/0042234 A1 * | 3/2003 | Suh | C21D 10/005 219/121.76 |
| 2004/0052581 A1 * | 3/2004 | Assler | B21J 15/02 403/408.1 |
| 2005/0092724 A1 * | 5/2005 | Warren, Jr. | B23K 26/03 219/121.85 |
| 2005/0155203 A1 * | 7/2005 | Prevey | B23P 9/02 29/90.01 |
| 2005/0182478 A1 * | 8/2005 | Holman | C21D 10/005 623/1.15 |
| 2007/0033980 A1 * | 2/2007 | Nishimura | B23P 6/04 72/362 |
| 2010/0287776 A1 * | 11/2010 | Dantou | B21J 15/147 29/897.2 |
| 2011/0248070 A1 | 10/2011 | Furfari et al. | |
| 2011/0290770 A1 | 12/2011 | Steinwandel et al. | |
| 2014/0134043 A1 | 5/2014 | Furfari et al. | |

FOREIGN PATENT DOCUMENTS

| | | |
|---|---|---|
| DE | 102010003742 A1 | 10/2011 |
| DE | 11 2010 001 810 T5 | 6/2012 |
| DE | 10 2012 111022 A1 | 6/2014 |
| EP | 0 094 912 B1 | 12/1986 |
| EP | 0 323 660 A1 | 7/1989 |
| EP | 1 752 547 A1 | 2/2007 |
| EP | 1 978 114 A1 | 10/2008 |
| EP | 2 364 374 B1 | 6/2013 |
| FR | 2 915 458 A1 | 10/2008 |
| GB | 2 257 163 A | 1/1993 |
| JP | 2006 281664 A | 10/2006 |
| WO | 96/27684 A1 | 9/1996 |
| WO | 2010/063643 A1 | 6/2010 |

OTHER PUBLICATIONS

ResearchGate, "Can compressive residual stresses be higher than material Yield strength?", with response by Jeremy S. RObinson on Jul. 15, 2014; https://www.researchgate.net/post/Can_compressive_residual_stresses_be_higher_than_material_Yield_strength, accessed Mar. 30, 2017.*
Schijve et al., "Fatigue of structures and secondary bending in structural elements", International Journal of Fatigue, 31:7, Jul. 2009, pp. 1111-1123; accessible from https://www.sciencedirect.com/science/article/pii/S0142112309000206; accessed Oct. 30, 2018 (Year: 2009).*
Juijerm, et al., "Fatigue lifetime improvement of aluminium alloys by mechanical surface treatment", Jan 2006; accessible from https://www.researchgate.net/publication/273456237_Fatigue_lifetime_improvement_of_aluminium_alloys_by_mechanical_surface_treatment; accessed Oct. 31, 2018 (Year: 2006).*
Raiano, Michele, "Improvement of the fatigue limit—Joints", Aerospace Engineering, Sep. 11, 2013; accessible from http://www.aerospaceengineering.net/?p=355; accessed Oct. 30, 2018 (Year: 2013).*
Rubio-Gonzalez C et al: "Effect of laser shock processing on fatigue crack growth and fracture toughness of 6061-T6 aluminum alloy", Materials Science and Engineering A: Structural Materials: Properties, Microstructure & Processing, Lausanne; CH, Bd. 386, Nr. 1-2, 25.11.2004, p. 291-295, XP004604669, ISSN: 0921-5093.
Shepard M J et al: "Introduction of Compressive Residual Stresses in TI-6AL-4V Simulated Airfoils via Laser Shock Processing", Journal of Materials Engineering and Performance, ASM International, Materials Park, OH, US, Bd. 10, Nr. 6, Dec. 1, 2001, p. 670-678, XP001089758, ISSN:1059-9495.
Rodopoulos C A et al: "Effect of Controlled Shot Peening and Laser Shock Peening on the Fatigue Performance of 2024-T351 Aluminum Alloy" Journal of Materials Engineering and Performance, ASM International, Materials Park, OH, US, Bd. 12, Nr. 4, Aug. 1, 2003, p. 414-419, XP001169992, ISSN: 1059-9495.
Liu, Q. et al: "The effect of laser power density on the fatigue life of laser-shock-peened 7050 aluminum alloy", Fatigue & Fracture of Engineering Materials & Structures, 30(11), 1110-1124, CODEN: FFESY; ISSN: 8756-758X, 2007, XP002576049.
Alberto Ruiz: "Surface acoustic wave velocity measurements on surface-treated metals by laser-ultrasonic spectroscopy", Feb. 17, 2004, University of Cincinnati, XP002576050, p. 90-93,118-125, Figs. 4.1-4.2,5.1-5.3.
European Search Report (EP 14157274.3) dated (Sep. 2014).
European Search Report (14183952.2) dated Feb. 17, 2015.
Jian et al., "Experimental Research on Residual Stress Distribution in Laser Rapid Forming Process", Rare Metal Material Engineering, vol. 33, Issue 12, Dec. 2004 (see Section 1.1 "Preparation of a forming test piece", on p. 1304, Figure 2 and Section 2.2 "Residual stress distribution characterisctis" on p. 1305, and Figures 3-4 and Section 2.3 "Discussion" on p. 1306.
Chinese Office Action for Application No. 201310573593.6 dated Feb. 3, 2015.
Xiang Zhang, Phil Irving, Marco Boscolo, Douglas Figueroa-Gordon, Giuliano Allegri; Fail Safety of Integral Metallic Structures Reinforced by Bonded Crack Retarders; Cranfield University, UK, 2006 (in Patorg).

(56) References Cited

OTHER PUBLICATIONS

M.-V. Uz, M. Kocak, F. Lemaitre, J.-C. Ehrström, S. Kempa, F. Bron, Improvement of Damage Tolerance of Laser Beam Welded Stiffened Panels for Airframes via Local Engineering, Int. Journal of Fatigue, 2008 (in Patorg).

M. Pacchione, E. Hombergsmeier, Hybrid Metal Laminates for Low Weight Fuselage Structures, in S.G. Pantelakis, C. A. Rodopoulos (Eds.), Engineering Against Fracture, Proceedings of the 1st Conference, Springer 2009 (in Patorg).

Gary L. Farley, John A. Newman, Mark A. James, Selective Reinforcement to Improve Fracture Toughness and Fatigue Crack Growth Resistance in Metallic Structures, 45th AIAA/ASME/ASCE/AHS/ASC Structures, Structural Dynamics & Materials Conference, 19-22 (in Patorg) Apr. 2004, Palm Springs, California.

Jon E. Rankin, Michael R. Hill, Lloyd A. Hackel, The effects of process variations on residual stress in laser peened 7049 T73 aluminum alloy, Materials Science and Engineering A349 (2003) pp. 279-291, Elsevier 2002.

E. Hombergsmeier, D. Furfari, N. Ohrloff, U.C. Heckenberger, V. Holzinger, Enhanced Fatigue and Damage Tolerance of Aircraft Components by Introduction of Residual Stresses—A Comparison of Different Processes, 27th ICAF Symposium, Jerusalem, Jun. 5-7, 2013 (in Patorg).

Yang et al. "Experimental Study on Residual Stress Distribution of Laser Rapid forming Process", Rare Metal Engineering, 33 (12), 2004.

Schijve J., "Fatigue damage in aircraft structures, not wanted, but tolerated?", International Journal of Fatigue, Jun. 2009, pp. 998-1011, vol. 31, Issue 6, Delft University of Technology, The Netherlands.

\* cited by examiner

PREVENTING CRACKS AT BOLTED OR RIVETED JOINTS OF AIRCRAFT STRUCTURAL PARTS

FIELD OF THE INVENTION

The invention relates to preventing cracks at bolted or riveted joints of aircraft structural parts. In particular, the invention relates to a method for joining two aircraft structural parts by a bolted or riveted joint and for preventing cracks at said joint as well as to an aircraft comprising first and second aircraft structural parts.

BACKGROUND OF THE INVENTION

Commercial transport aircraft fuselage and wing structures may be built by assembling stiffened panels, for example fuselage skin panels with frames and stringers or wing skin panels with ribs and stringers, by means of mechanically fastened joints. For example, fuselage stiffened panels may be assembled in single lab shear-joints longitudinally, i.e. in flight direction, to form a fuselage barrel which may be assembled together with the next fuselage barrel by means of circumferential joints, which may be in a butt-joint configuration. Moreover, wing box structures may be assembled in similar fashion by means of butt-joints, for example cordwise and spanwise.

Due to the cyclic loads that affect aircraft structures are subjected, fatigue crack initiation and growth may affect the aircraft structures. Among others, locations that are prone to fatigue damages are the mechanically fastened joints such as longitudinal and circumferential joints in fuselage or in wing structures. Usually, such cracks propagate longitudinally and circumferentially on the fuselage or cordwise on wing panels. In order to prevent this, the fuselage of the aircraft has to be regularly maintained and inspected.

Nowadays, doublers or straps made of titanium alloys may be used as selective reinforcement structure to slow down crack growth and to eventually stop the propagation and to ensure large damage capability. A commonly adapted solution relates to the use of crack stoppers which are, for example, made of titanium. Such stiffeners or crack stoppers are currently applied to longitudinal frames of fuselage structures.

DE 10 2012 111 022 relates to a vehicle structure component reinforced by means of an area comprising compressive residual stresses in a first direction and compressive or tensile residual stresses in a second direction.

DE 10 2008 044 407 relates to a method for preventing crack formation and for slowing down the advancement of a crack in metal aircraft structures by way of laser shock rays.

BRIEF SUMMARY OF THE INVENTION

There may be a need to reduce the weight and to improve the maintenance of aircrafts.

A first aspect of the invention relates to a method for joining two aircraft structural parts by a bolted or riveted joint and for preventing cracks at said joint. The method comprises the step of providing a first metallic aircraft structural part and a second aircraft structural part, wherein the first aircraft structural part comprises a first joint region and the second aircraft structural part comprises a second joint region. Moreover, the method includes the step of inducing compressive residual stresses in a first area of the first joint region for preventing cracks. In a further step the first and second aircraft structural parts are fastened together at the first and second joint regions by a bolted or riveted joint.

An aspect of the invention may thus be seen in applying compressive residual stresses in regions of aircraft structural parts where these aircraft structural parts are fastened together by a bolted or riveted joint.

In the context of the present application the term "joining" may refer to fastening together two aircraft structural parts or, in other words, to establishing a bolted or riveted joint between two aircraft structural parts. Aircraft structural parts may hereby refer to skin panels, frames, ribs and/or stringers of a fuselage, wing box, wing, horizontal stabilizer and/or vertical stabilizer. The bolted or riveted joint between the two aircraft structural parts may for example be a shear-joint or a butt-joint. Under preventing cracks the skilled person may understand that crack initiation is prevented and/or that crack growth is stopped or at least slowed down. The cracks may be, for example, fatigue cracks that occur due to cyclic loads acting onto the aircraft structures.

The first metallic aircraft structural part may, for example, be manufactured from alloy, titanium or another metallic material. The second aircraft structural part may be metallic or non-metallic. For example, the second aircraft structural part may be manufactured from compound material. In the context of the present application, the joint region relates to a region of the respective structural part where the two structural parts are joined together by the bolted or riveted joint. For example, when the first and second aircraft structural parts are joined together by a shear-joint, the first and second regions of the first and second aircraft structural parts overlap. If the two aircraft structural parts are joined by a butt-joint, the butt-joint specimen or butt-strap overlaps with the first and second regions of the first and second aircraft structural parts.

The compressive residual stresses may for example be induced by Laser Shock Peening (LSP) or by low plasticity burnishing or deep rolling. The compressive residual stresses may be applied to the aircraft structural part from one side only or from both sides of the aircraft structural part. Said compressive residual stresses may reach through the whole thickness of the aircraft structural part.

The step of fastening together the first and second aircraft structural parts may refer to establishing the bolted or riveted joint between the first and second aircraft structural parts. In other words, the first aircraft structural part may be attached to the second aircraft structural part and vice versa.

By inducing such compressive residual stresses in the joint region of two aircraft structural parts, cracks in the joint region are prevented. In this way, doublers or crack stoppers at bolted or riveted joints of two aircraft structural parts may be left out or the thickness of the structural parts may be reduced which leads to a weight reduction of the aircraft. Furthermore, since by providing compressive residual stresses joints between aircraft structural parts are less prone to cracks, maintenance intervals for joints of two aircraft structural parts may be prolonged such that the workload for maintenance is reduced.

According to an exemplary embodiment of the invention, the second aircraft structural part is metallic. Furthermore, the method further comprises the step of inducing compressive residual stresses in a second area of the second joint region for preventing cracks. In this way, cracks are prevented in both joint regions of both aircraft structural parts.

According to another exemplary embodiment of the invention, the first and second aircraft structural parts are fastened together by a shear-joint. Moreover, the first area and second area do not fully overlap when fastening together the first and second aircraft structural parts.

In a shear-joint configuration, the first and second aircraft structural parts may be arranged in such a way that the first and second regions of the first and second aircraft structural parts overlap. Moreover, the first and second aircraft structural parts are arranged in such a way that the first area and the second area do not fully overlap such that a larger area is covered with compressive residual stresses. For example, the first and second areas are located at end sections of the first and second regions, respectively.

According to another exemplary embodiment of the invention, the step of inducing compressive residual stresses is performed before the step of fastening together the first and second aircraft structural parts.

For example, the step of inducing compressive residual stresses may be carried out before drilling fastener holes for attaching together the aircraft structural parts. Inducing compressive residual stress before drilling holes allows through thickness compressive residual stresses which are provided along the surface and in proximity of the hole after removing the material, i.e. the drilling operation.

According to a further exemplary embodiment of the invention, the method further comprises the step of drilling fastener holes in the first and second areas of the first and second aircraft structural parts after inducing compressive residual stresses. Moreover, the method comprises the step of installing fasteners through the drilled fastener holes for creating the riveted or bolted joint of the first and second aircraft structural parts.

Furthermore, fastener holes may be also drilled in remaining parts of the first and second regions where no residual compressive stresses may be induced. Thus, the first and second aircraft structural parts may also be fastened together at areas of the first and second regions where no residual compressive stresses may be induced.

According to another exemplary embodiment of the invention, the first and second aircraft structural parts are fastened together by a butt-joint. Moreover, the method further comprises the step of providing a butt-joint specimen for connecting the first and second aircraft structural parts. In a further step, compressive residual stresses in a third area of the butt-joint specimen are induced. Subsequently, the first and second aircraft structural parts are connected by the butt-joint specimen.

The butt-joint specimen or butt-strap may refer to a plate which is configured for connecting and fastening together the first and second aircraft structural parts. By connecting the first and second aircraft structural parts with the butt-joint specimen, the butt-joint specimen overlaps with the first and second regions of the first and second aircraft structural parts. In other words, the first and second aircraft structural parts are fastened to the butt-joint specimen such that the first and second aircraft structural parts are fastened together by the butt-joint specimen.

In this way the creation and/or propagation of cracks are prevented in the aircraft structural parts and in the butt-joint specimen.

According to a further exemplary embodiment of the invention, the method comprises the steps of drilling fastener holes in the butt-joint specimen after inducing compressive residual stresses in the butt-joint specimen. Moreover, the method comprises the step of installing fasteners through the drilled holes in the joint regions of the first and second aircraft structural parts and the butt-joint specimen for creating the riveted or bolted joint of the first and second aircraft structural parts.

Inducing compressive residual stress before drilling holes allows through thickness compressive residual stresses which are provided along the surface and in proximity of the hole after removing the material, i.e. the drilling operation.

According to a further exemplary embodiment of the invention, the step of inducing compressive residual stresses comprises laser shock peening the joint region in order to induce the compressive residual stresses and/or burnishing the joint region by low plastic burnishing or deep rolling in order to induce the compressive residual stresses.

Laser Shock Peening, Low Plasticity Burnishing and Deep Rolling are technologies for inducing compressive residual stress in metallic materials which are capable to induce deep compressive residual stress into metallic materials. Such residual stresses, e.g., may be much deeper than in conventional processes such as Shot Peening. Moreover, through thickness compressive residual stresses may be achieved using such technologies.

According to another exemplary embodiment of the invention, the compressive residual stresses range between −10 MPa and a Yield Strength of a material of the aircraft structural part, wherein the Yield Strength is a negative value.

For instance, compressive residual stresses may amount to −400 MPa for Al alloys. Negative values hereby may denote compressive residual stresses.

According to another exemplary embodiment of the invention, the first aircraft structural part is a first aircraft skin panel and the second aircraft structural part is a second aircraft skin panel.

In this way, cracks may be prevented in longitudinal and/or circumferential joints of aircraft skin panels.

A second aspect of the invention relates to an aircraft comprising a first aircraft structural part having a first joint region and a second aircraft structural part having a second joint region. Furthermore, the first joint region comprises a first area with compressive residual stresses for preventing cracks. Moreover, the first and second aircraft structural parts are fastened together at the first and second joint regions by a bolted or riveted joint.

For example, the bolted or riveted joint between the first and second aircraft structural parts may be established with a method described in the context of the present application. Therefore, features and advantages that are described with respect to the method may also relate to the aircraft.

According to an exemplary embodiment the second joint region comprises a second area with compressive residual stresses for preventing cracks.

According to a further exemplary embodiment the first area and the second area do not fully overlap.

According to a further exemplary embodiment the first aircraft structural part is a first aircraft skin panel and the second aircraft structural part is a second aircraft skin panel.

According to a further exemplary embodiment the bolted or riveted joint is a shear-joint or a butt-joint.

The aspects described above and further aspects, features and advantages of the invention may also be found in the exemplary embodiments which are described in the following with reference to the appended drawings.

BRIEF DESCRIPTION OF THE DRAWINGS

The figures are schematic and may not be true to scale. If the same reference signs are used in different figures, they may refer to corresponding elements. Moreover, corresponding elements may also be labelled with different reference signs.

DETAILED DESCRIPTION

In FIGS. 1A to 1E, the process of establishing a bolted or riveted joint between two aircraft structural parts is exemplarily shown for a first aircraft skin panel 100 and a second aircraft skin panel 110. Thus, the first aircraft structural part is the first aircraft skin panel 100 and the second aircraft structural part is the second aircraft skin panel 110. The method described in the context of the present invention may however, also be used for establishing a bolted or riveted joint between other aircraft structural parts, for example between an aircraft skin panel and a frame.

Figure 1A:
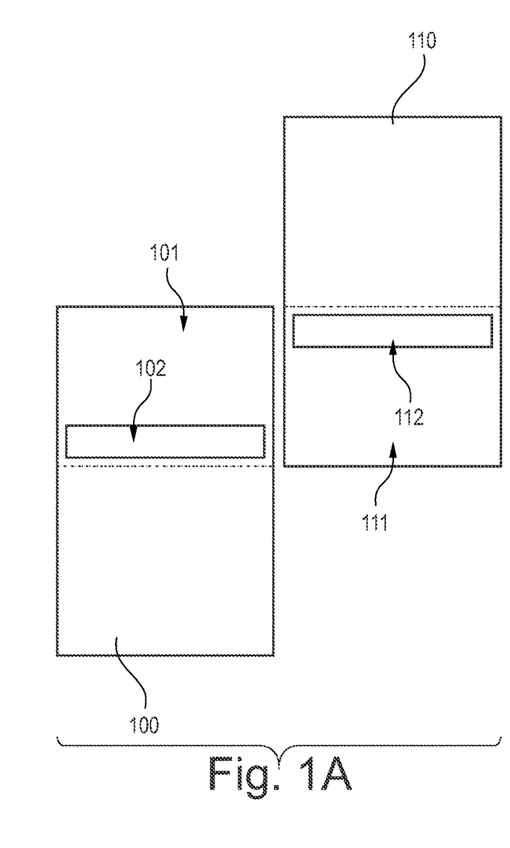
FIGS. 1A to 1E show the process of establishing a shear-joint between two aircraft structural parts according to an exemplary embodiment of the invention.

In FIG. 1A it is shown that the first aircraft skin panel 100 and the second aircraft skin panel 110 are provided. The first aircraft skin panel 100 comprises the first joint region 101 and the second aircraft skin panel 110 comprises a second joint region 111. Furthermore, a first area of compressive residual stresses 102 is induced in the first region 101 and a second area of compressive residual stresses 112 is induced in the second joint region, for example by Laser Shock Peening or by low plasticity burnishing or deep rolling. By applying the areas 102 and 112 comprising compressive residual stresses, the initiation and propagation of cracks in said areas is prevented.

Figure 1B:
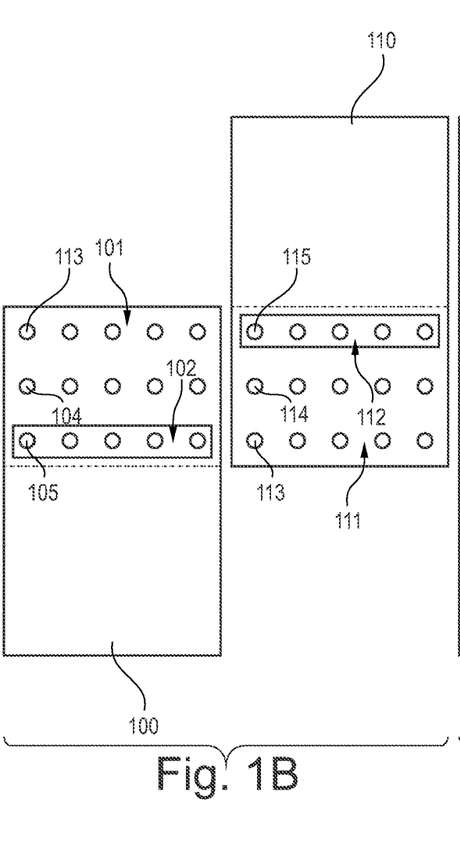

In FIG. 1B, a subsequent step is shown where a fastening hole 103 is drilled in the first area 102 and a fastening hole 113 is drilled in the second area 112. Furthermore, fastening holes 104 and 105 are drilled in the first joint region 101 in an area where no compressive residual stresses are induced. Similarly, fastening holes 114 and 115 are drilled in the second joint region 111 in an area where no compressive residual stresses are induced.

Figures 1C, 1D, 1E:
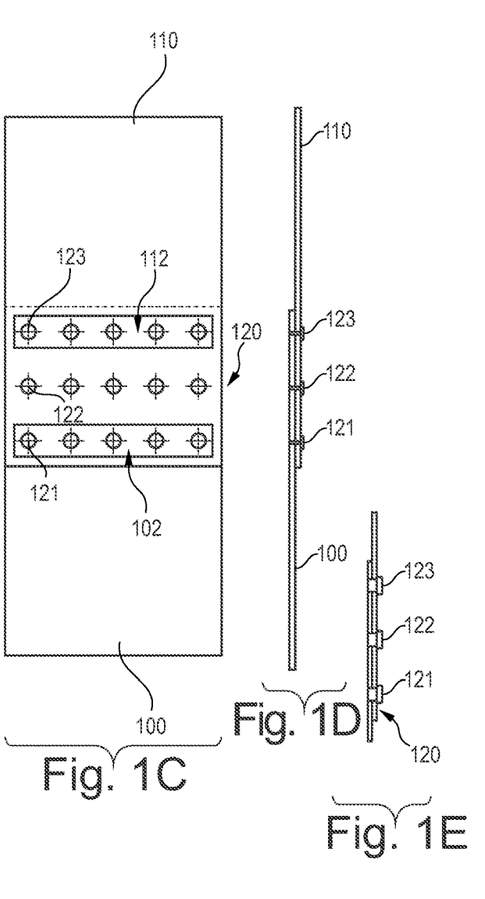

In FIG. 1C, the step of joining the first and second aircraft skin panels 100 and 110 by a shear-joint 120 is shown. By establishing the shear-joint 120, fastening holes of the first aircraft skin panel 100 align with fastening holes of the second aircraft skin panel 110. Moreover, the aircraft skin panels 100 and 110 are arranged in such a way that the first area 102 and the second area 112 do not fully overlap such that a larger area is covered with compressive residual stresses for preventing cracks. The first aircraft skin panel 100 and the second aircraft skin panel 110 are then fastened together by fasteners 121, 122 and 123 which are installed through the pairs of fastening holes 103 and 115, 104 and 114, as well as 105 and 113. The fasteners 121, 122 and 123 may, for example, be rivets.

In FIG. 1D, a side view of the first and second aircraft skin panels 100 and 110 in the shear-joint configuration is shown. In FIG. 1E, an enlarged section of the shear-joint 120 is depicted, where it can be seen that the first aircraft skin and the second aircraft skin overlap in the joint region.

In FIGS. 2A to 2E, the process of joining two aircraft structural parts is exemplarily shown for two aircraft skin panels 100 and 110 in a butt-joint configuration. Since the components and the steps shown in FIGS. 2A to 2E are mostly identical or similar to the ones shown in FIGS. 1A to 1E, it is referred to FIGS. 1A and 1E and only the differences between FIGS. 1A to 1E and 2A to 2E are described in the following.

Figure 2A:
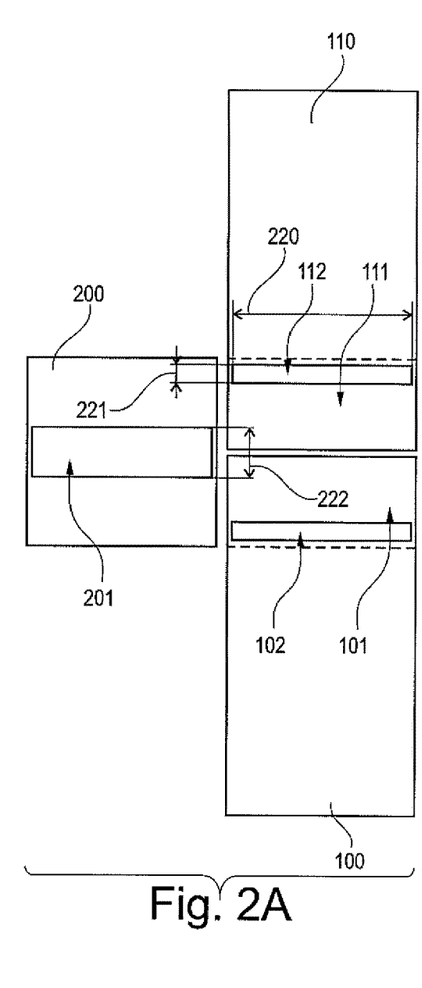
FIGS. 2A to 2E show the process of establishing a butt-joint between two aircraft structural parts according to another exemplary embodiment of the invention.

In FIG. 2A it is shown that in contrast to the shear-joint configuration of FIGS. 1A to 1E, first and second aircraft skin panels 100 and 110 as well as a butt-joint specimen or butt-strap 200 are provided. In the butt-joint specimen 200, a third area with compressive residual stresses is induced, for example by Laser Shock Peening or by low plasticity burnishing or deep rolling. The first area 102, the second area 112 and the third area 201 are located in such a way that the first, second and third areas 102, 112 and 201 do not fully overlap when the butt-joint configuration is established as shown in FIG. 2C. Furthermore, third area 201 is designed or induced in such a way that both, the first region 101 and the second region 111 overlap with the third area 201 when the butt-joint configuration is established.

The first, second and third areas 112, 102 and 201 have a length of 120 mm which approximately equals to the width of the first and second skin panels 100 and 110. The width of the first and second areas 102 and 112 is for example 10 cm. The width of the third area is for example 30 mm.

Figure 2B:
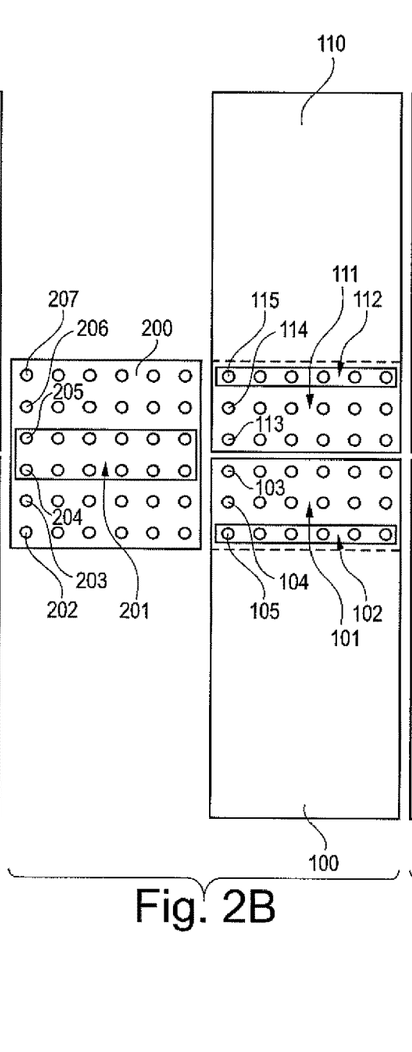
Figures 2C, 2D:
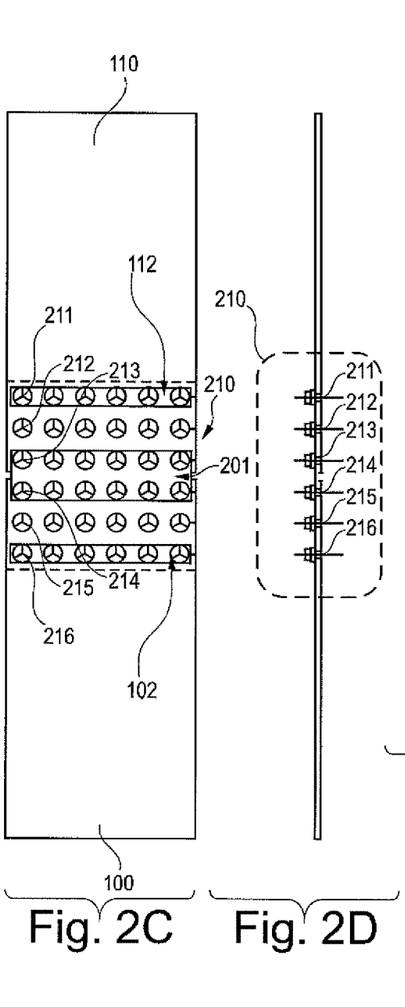

In FIG. 2B it is shown that fastener holes 105 and 115 are drilled in the first and second areas respectively. Furthermore, fastener holes 103, 104 and 113, 114 are drilled in the first and second joint regions 101 and 111 in areas, where no compressive residual stresses are induced. Furthermore, fastener holes 204 and 205 are drilled in the third region 201 of the butt-joint specimen. Furthermore, fastener holes 202, 203, 206 and 207 are drilled into the butt-joint specimen 200 in areas, where no compressive residual stresses are induced.

In FIG. 2C it is shown that the butt-joint 210 between the first aircraft skin panel 100 and the second aircraft skin panel 110 is established such that fastening holes of the first or second aircraft skin panel 100 and 110 align with fastening holes of the butt-joint specimen 200. Subsequently, fasteners 211 to 216 are installed through said pairs of fastening holes in order to establish the butt-joint 210 between the aircraft skin panels 100 and 110.

Figure 2E:
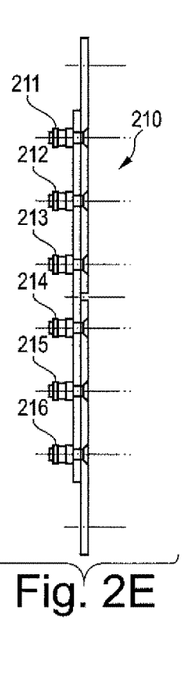

In FIGS. 2D and 2E, a side view of the butt-joint 210 of the first aircraft skin panel and the second aircraft skin panel is shown. In FIG. 2E it can be seen that the butt-joint specimen overlaps with both, the first and second aircraft skin panels.

Figure 3A:
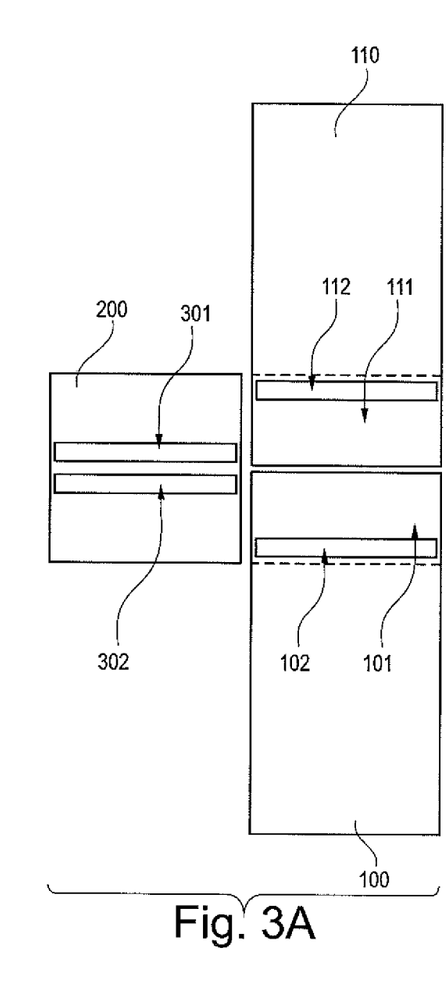
FIGS. 3A to 3E show the process of establishing a butt-joint between two aircraft structural parts according to another exemplary embodiment of the invention.
Figure 3B:
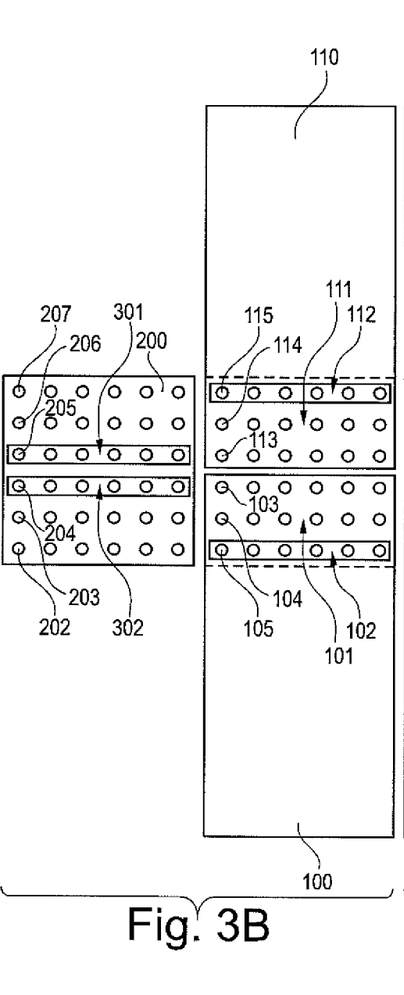
Figure 3C:
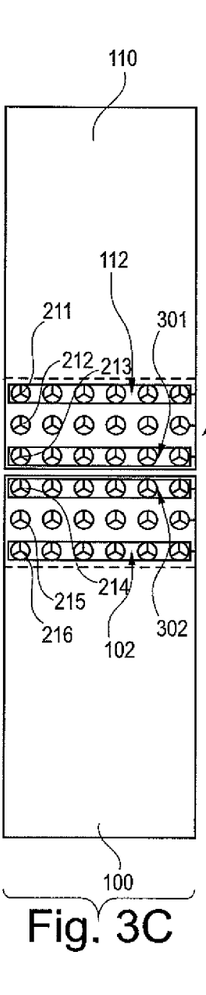
Figure 3D:
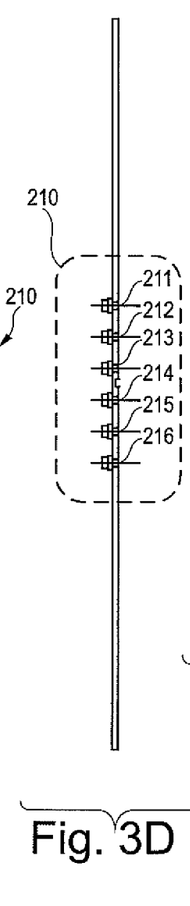
Figure 3E:
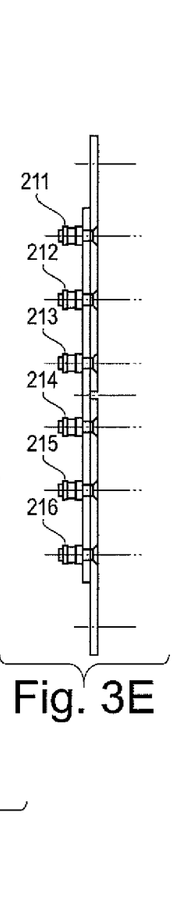

FIGS. 3A to 3E also show the process of establishing a butt-joint between two aircraft skin panels 100 and 110. It is therefore referred to the description of FIGS. 1A to 1E and 2A to 2E. In contrast to the process shown in FIGS. 2A to 2E, a third area 301 and a fourth area with compressive residual stresses are induced in the butt-joint specimen 200 as shown in FIG. 3A. In FIG. 3C it is shown that the third area 301 overlaps with the second region 111 of the second aircraft skin panel 110 and the fourth area 302 overlaps with the first region 101 of the first aircraft skin panel 100.

Figure 4:
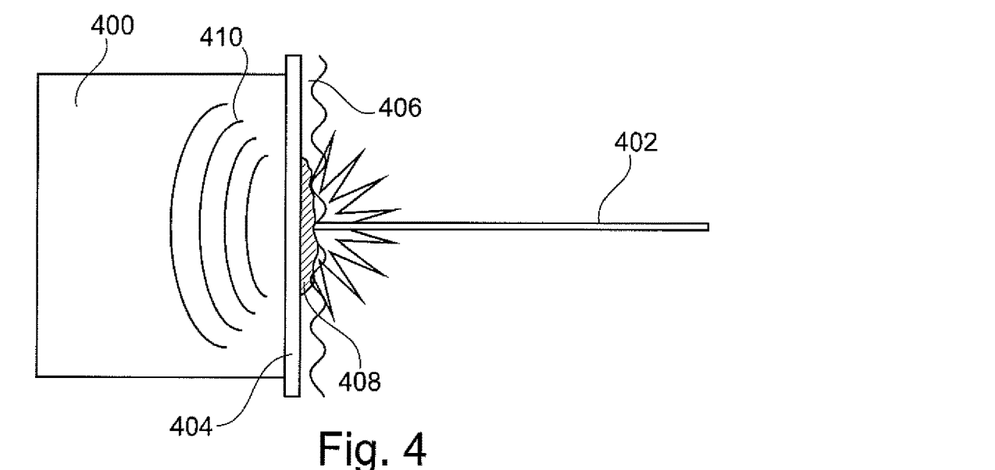
FIG. 4 shows the process of inducing compressive residual stresses by Laser Shock Peening according to another exemplary embodiment of the invention.

FIG. 4 shows the process of Laser Shock Peening according to an exemplary embodiment of the invention. A cross-section of an aircraft structural part 400 to be treated by Laser Shock Peening is shown. The surface of the structural part 400 may be overlaid with an opaque overlay 404, for example, paint or tape. In addition, the surface of the structural part 400 also comprises a transparent overlay 406, for example, a thin film of flowing water. In order to induce compressive residual stresses, a laser pulse 402 is shot onto the component. In the region where the laser pulse 402 hits onto the structural part 400, a confined plasma 408 is created by evaporation or sublimation of the opaque overlay 404. The plasma 408 may induce an explosive force which causes shockwaves 410 in the structural part 400. These shockwaves 410, again, result in compressive residual stresses in the region that is treated with the laser 402.

In Laser Shock Peening, the laser beam 402 may be used to drive a high amplitude shockwave onto the structural part 400 surface using a high energy pulsed laser. When the peak of the pressure of the shockwave is greater than the dynamic yield strength of the material, mechanical local plastic deformations may be produced which induce a compressive residual stress field through the thickness of the material. The laser peening treatment may be addressed at some distance perpendicular to a crack growth path direction in order to achieve a residual stress field needed to reduce the crack propagation rates. In order to have a uniform compressive residual stress field through the whole thickness of the structural part 400, the Laser Shock Peening treatment may be performed with a certain overlap degree. In other words, several layers of Laser Shock Peening treatment may be applied onto the structural part 400. Moreover, it is also possible to treat both sides of the structural part 400 by means of Laser Shock Peening. In this way, it is possible to achieve a compression through the whole thickness of the structural part 400.

Figure 5:
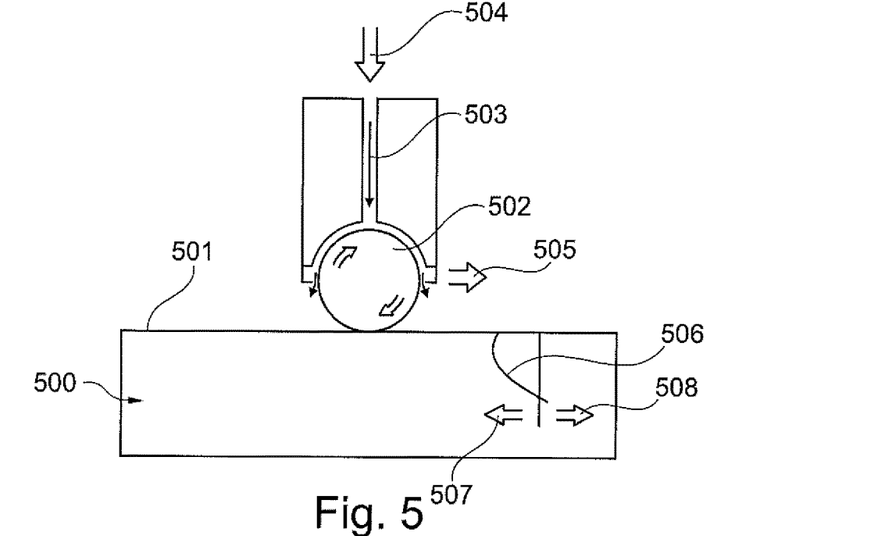
FIG. 5 shows the process of inducing compressive residual stresses by low plasticity burnishing according or deep rolling to an exemplary embodiment of the invention.

FIG. 5 shows a process of inducing compressive residual stresses in an area of an aircraft structural part 500 by low plasticity burnishing or deep rolling. The low plasticity burnishing or deep rolling tool comprises a metallic ball 502 which is supported by a constant volume of fluid 503 running around the ball and the surface 501 of the treated aircraft structural part 500. The high pressure 504 is applied onto the ball and the process surface 501 of the aircraft structural part thereby plastifying the material at the near surface and creating compressive residual stresses. The low plasticity burnishing tool is then moved or rolled along the horizontal direction 505. In this way, residual stresses 506 are applied wherein the direction 507 indicates compressive residual stresses and the direction 508 relates to tensile residual stresses.

Figure 6:
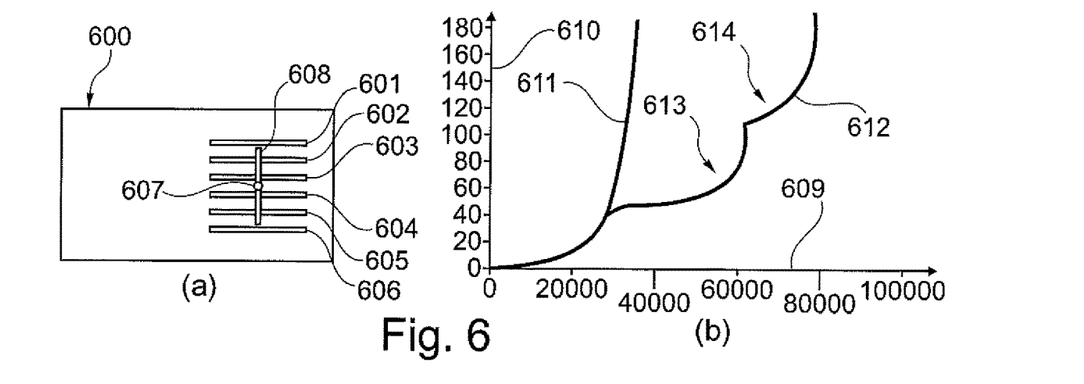
FIGS. 6a-6b demonstrate the effect of areas having compressive residual stresses on crack propagation according to an exemplary embodiment of the invention.

In FIG. 6a, a portion of an aircraft structural part, e.g., an aircraft skin panel 600 having 6 parallel crack retarding regions formed as stripes 601-606 is depicted. Each stripe 601-606 is applied by means of Laser Shock Peening. The separation of each stripe to adjacent stripes is 40 mm. A crack starts at the point 607 and travels along the direction 608. On the right-hand side, in FIG. 6b, a diagram with an axis 609 denoting the number of load cycles and an axis 610 denoting the size of the crack is shown. The curve 611 shows the crack length in function of the loading cycles if no crack retarding regions are applied to the material. The curve 612 shows the behaviour of the crack length in function of the load cycles if the crack retarding regions 601-606 are provided. It can be gathered, that in the regions 613 and 614, the crack retarding regions 603 and 602 severely reduce the crack growth such that the number of loading cycles that may be applied to the aircraft skin panel 600 may be doubled in order to end up the same crack length compared to an aircraft skin having no crack retarding regions.

Figures 7, 8, 9, 10:
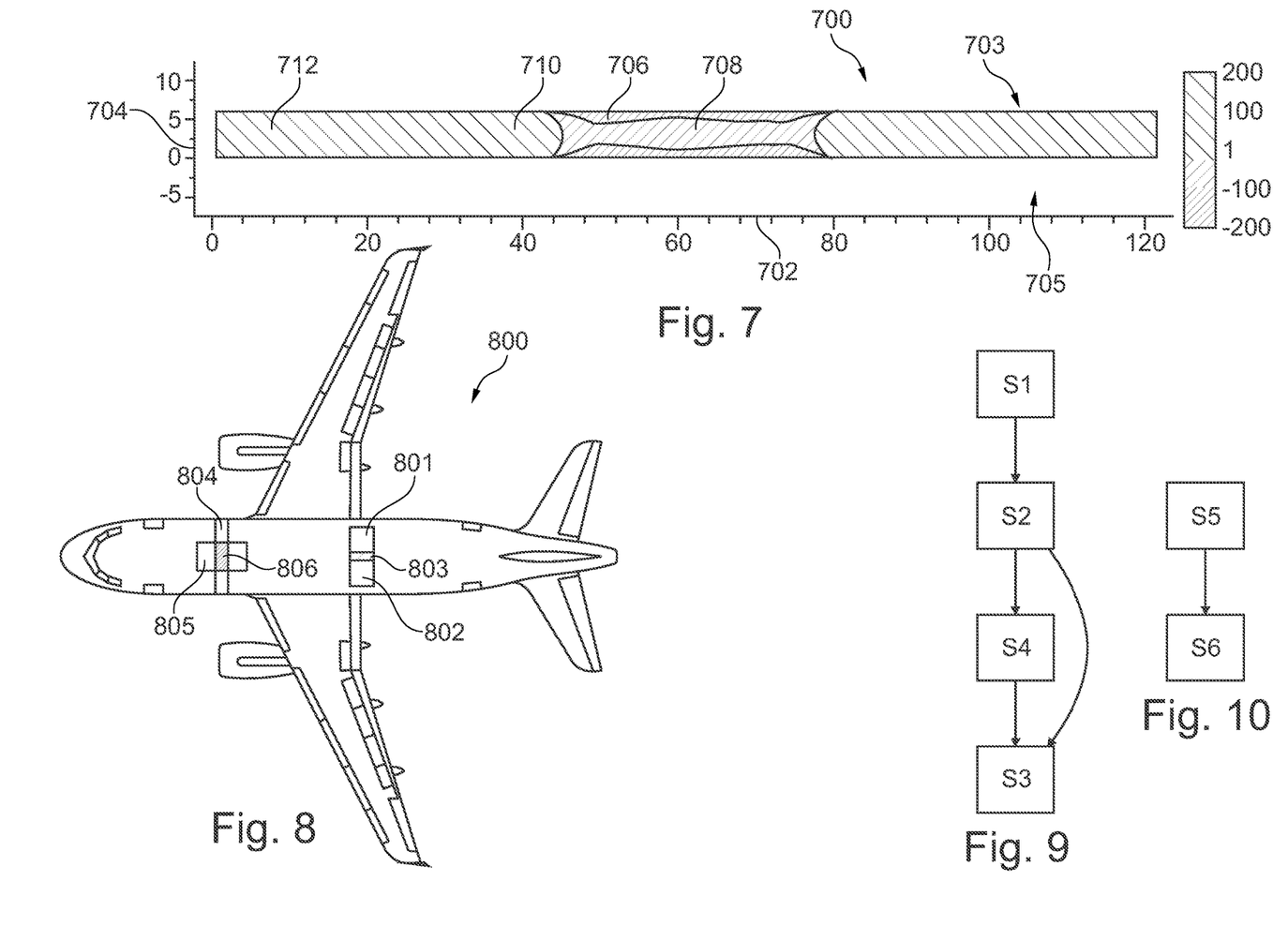
FIG. 7 shows the distribution of residual stresses in an aircraft structural part according to an exemplary embodiment of the invention.
FIG. 8 shows an aircraft according to an exemplary embodiment of the invention.
FIG. 9 shows a flow-chart for a method according to an exemplary embodiment of the invention.
FIG. 10 shows a flow-chart for a method according to an exemplary embodiment of the invention.

In FIG. 7, a cross-section of an aircraft structural part, e.g., an aircraft skin panel 700 is depicted. The aircraft skin panel 700 comprises an inner side 705 and an outer side 703. The axis 702 denotes an extension of the aircraft skin panel that is parallel to the surface of the aircraft skin panel. The axis 704 denotes a direction along the depth of the aircraft skin panel 700. In this exemplary embodiment, the aircraft skin panel 700 has a thickness of 6.36 mm. Moreover, different regions having different compressive residual stresses that are induced by Laser Shock Peening are depicted. In the region 706 compressive residual stresses are provided that are in the range between −150 MPa and −250 MPa. In the region 708, the compressive residual stresses are around −100 MPa. In the region 710, next to the region with the compressive residual stresses, slight tensile residual stresses are apparent in the material. This tensile residual stresses amount to 50 to 100 MPa. In the region 712 that is further away from the regions 706 and 708, there are no compressive or tensile residual stresses. This stresses are, for example, applied from both sides 703 and 705 by Laser Shock Peening.

In FIG. 8, an aircraft 800 according to an exemplary embodiment of the invention is shown. The aircraft comprises a first aircraft structural part 801 and a second aircraft structural part 802 which are joined by a bolted or riveted joint 803. For example, the first and second aircraft structural parts 801 and 802 are aircraft skin panels. Moreover, the aircraft comprises a frame 804 and a further aircraft skin panel 805 which are joined by a bolted or riveted joint 806. The bolted or riveted joints 803 and 806 are provided as described in the context of the present application and comprise areas with compressive residual stresses for preventing cracks.

FIG. 9 shows a flow-chart for a method according to an exemplary embodiment of the invention. The method for joining two aircraft structural parts by a bolted or riveted joint and for preventing cracks at said joint comprises the step S1 of providing a first metallic aircraft structural part and a second aircraft structural part, wherein the first aircraft structural part comprises a first joint region and a second aircraft structural part comprises a second joint region. Subsequently, the step S2 of inducing compressive residual stresses in a first area of the first joint region for preventing cracks is performed. Subsequently, the step S3 of fastening together the first and second aircraft structural parts at the first and second joint regions by a bolted or riveted joint is carried out. Optionally, the step S4 of inducing compressive residual stresses in a second area of the second joint region of the second aircraft structural part, which is metallic, is carried out between the steps S2 and S3.

In FIG. 10, further method steps are shown according to an exemplary embodiment which are carried out after the step S2 shown in FIG. 9. The step S5 comprises drilling fastener holes in the first and second areas of the first and second aircraft structural parts after inducing compressive residual stresses. The step S6 relates to installing fasteners through the drilled holes for creating the riveted or bolted joint of the first and second aircraft structural parts.

In the claims, the word "comprising" does not exclude other elements or steps and the indefinite article "a" or "an" does not exclude a plurality. Furthermore, other variations to the disclosed embodiments can be understood and effected by those skilled in the art in practising the claimed invention, from a study of the drawings, from the disclosure, and from the appended claims. Reference signs which are provided in the claims should not be understood to limit the scope of the claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for joining two aircraft structural parts by a bolted or riveted joint and for preventing cracks at said joint, the method comprising:
    providing a first metallic aircraft structural part and a second aircraft structural part, wherein the first aircraft structural part comprises a first joint region and the second aircraft structural part comprises a second joint region;
    overlaying a first area of the first joint region with a first opaque overlay;
    overlaying the first opaque overlay with a first transparent overlay;
    inducing compressive residual stresses in the first area of the first joint region for preventing cracks by applying parallel crack retarding regions formed as stripes in the first area by shooting a laser pulse thereon;
    overlaying a second area of the second joint region with a second opaque overlay;
    overlaying the second opaque overlay with a second transparent overlay;
    inducing compressive residual stresses in the second area of the second joint region for preventing cracks by applying parallel crack retarding regions formed as stripes in the second area by shooting a laser pulse thereon;
    applying a plurality of layers of laser shock peening treatment onto the first area and the second area;
    drilling at least a first fastener hole in the first area and at least a second fastener hole in the second area of the first aircraft structural part and the second aircraft structural part, respectively, after inducing compressive residual stresses in the first area and the second area;
    drilling at least a third fastener hole outside the second area in the second joint area configured to be aligned with the first hole and at least a fourth fastener hole outside the first area in the first joint area configured to be aligned with the second hole;
    arranging the first aircraft structural part and the second aircraft structural part in such a way that the first area and the second area do not overlap and the first and second joint regions overlap with one another; and
    installing a plurality of fasteners through the drilled fastener holes for creating the riveted or bolted joint of the first and second aircraft structural parts, such that the first and second aircraft structural parts are fastened together at the first and second joint regions by the bolted or riveted joint, wherein a first of the plurality of fasteners is installed through the first fastener hole in the first area and the third hole in the second joint region and a second of the plurality of fasteners is installed through the second fastener hole in the second area and the fourth hole in the first joint region,
    wherein the first area and second area do not overlap when fastening together the first and second aircraft structural parts.

2. The method according to claim 1, wherein the second aircraft structural part is metallic.

3. The method according to claim 2, wherein the first and second aircraft structural parts are fastened together by a shear-joint.

4. A method for joining two aircraft structural parts by a bolted or riveted joint and for preventing cracks at said joint, wherein the first and second aircraft structural parts are fastened together by a butt-joint, the method comprising:
    providing a first metallic aircraft structural part and a second aircraft structural part, wherein the first aircraft structural part comprises a first joint region and the second aircraft structural part comprises a second joint region;
    overlaying a first area of the first joint region with a first opaque overlay;
    overlaying the first opaque overlay with a first transparent overlay;
    inducing compressive residual stresses in the first area of the first joint region for preventing cracks by applying parallel crack retarding regions formed as stripes in the first area by shooting a laser pulse thereon;
    overlaying a second area of the second joint region with a second opaque overlay;
    overlaying the second opaque overlay with a second transparent overlay;
    inducing compressive residual stresses in the second area of the second joint region for preventing cracks by applying parallel crack retarding regions formed as stripes in the second area by shooting a laser pulse thereon;
    drilling at least a first fastener hole in the first area, and at least a second hole in the second area of the first aircraft structural part and the second aircraft structural part, respectively, after inducing compressive residual stresses in the first area and the second area;
    drilling at least a third hole outside the first area in the first joint region and at least a fourth hole outside the second area in the second joint region;
    providing a butt-joint specimen for connecting the first and second aircraft structural parts;
    overlaying a third area of the butt-joint specimen with a third opaque overlay;
    overlaying the third opaque overlay with a third transparent overlay;
    inducing compressive residual stresses in the third area of the butt-joint specimen by shooting a laser pulse thereon;
    drilling at least a fifth fastener hole and a sixth fastener hole in the butt-joint specimen in the third area after inducing compressive residual stresses in the butt-joint specimen in the third area;

drilling at least a seventh fastener hole and an eighth fastener hole in the butt-joint specimen outside the third area, wherein the fifth and the sixth fastener holes are configured to be aligned with the third hole and the fourth hole, respectively, and the seventh fastener hole and the eighth fastener hole are configured to be aligned with the first and second fastener holes, respectively; and connecting the first and second aircraft structural parts by the butt-joint specimen by installing a plurality of fasteners through the drilled holes in the first and second joint regions of the first and second aircraft structural parts and the butt-joint specimen for creating the riveted or bolted joint of the first and second aircraft structural parts, wherein a first of the plurality of fasteners is installed through the first fastener hole and the seventh hole, a second of the plurality of fasteners is installed through the second fastener hole and the eighth hole, a third of the plurality of fasteners is installed through the fifth hole and the third hole, and a fourth of the plurality of fasteners is installed through the sixth hole and the fourth hole, wherein the first area and the third area do not overlap with one another when the butt-joint specimen overlaps with the first joint region, and wherein the second area and the third area do not overlap with one another when the butt-joint specimen overlaps with the second joint region.

5. The method according to claim 1, wherein the compressive residual stresses are induced such that the residual stresses range between −10 MPa and a Yield Strength of a material of the first aircraft structural part, wherein the Yield Strength is a negative value.

6. The method of claim 1, further comprising:
drilling at least a fifth fastener hole outside the first area; and
drilling at least a sixth fastener hole outside the second area,
wherein the step of installing fasteners comprises installing a fastener through the fifth fastener hole outside the first area in the first joint region and through the sixth fastener hole outside the second area in the second joint region.

7. The method of claim 4, further comprising drilling a ninth fastener hole in the first joint region outside the first area or in the second joint region outside the second area; and
drilling a tenth fastener hole in the butt-joint specimen outside the third area.

8. The method of claim 7, wherein the step of installing fasteners comprises installing a fastener through the ninth fastener hole outside the first area in the first joint region or outside the second area in the second joint region and through the tenth fastener hole in the butt-joint specimen outside the third area.

9. The method of claim 1, wherein the first and second opaque overlays comprise a paint or a tape.

10. The method of claim 1, wherein the first and second transparent overlays comprise a thin film of flowing water.

* * * * *